United States Patent
Peterson et al.

(10) Patent No.: US 10,119,556 B2
(45) Date of Patent: Nov. 6, 2018

(54) SYSTEM HAVING COMBINABLE TRANSMISSION AND IMPLEMENT CIRCUITS

(71) Applicant: Caterpillar Inc., Peoria, IL (US)

(72) Inventors: Jeremy Todd Peterson, Washington, IL (US); Jeffrey Lee Kuehn, Germantown Hills, IL (US); Bryan E. Nelson, Chillicothe, IL (US); Paul Anthony Dvorak, Sanford, NC (US)

(73) Assignee: Caterpillar Inc., Deerfield, IL (US)

( * ) Notice: Subject to any disclaimer, the term of this patent is extended or adjusted under 35 U.S.C. 154(b) by 371 days.

(21) Appl. No.: 14/961,244

(22) Filed: Dec. 7, 2015

(65) Prior Publication Data
US 2017/0159678 A1    Jun. 8, 2017

(51) Int. Cl.
*F15B 11/17*    (2006.01)
*E02F 3/34*    (2006.01)
(Continued)

(52) U.S. Cl.
CPC .............. *F15B 11/17* (2013.01); *E02F 3/34* (2013.01); *E02F 9/2217* (2013.01); *E02F 9/2228* (2013.01); *E02F 9/2242* (2013.01); *E02F 9/2253* (2013.01); *E02F 9/2289* (2013.01); *E02F 9/2292* (2013.01); *E02F 9/2296* (2013.01); *F15B 1/024* (2013.01); *F16H 61/4078* (2013.01); *F15B 2211/20523* (2013.01); *F15B 2211/20546* (2013.01); *F15B 2211/20569* (2013.01); *F15B 2211/20576* (2013.01); *F15B 2211/212* (2013.01); *F15B 2211/27* (2013.01); *F15B 2211/3053* (2013.01); *F15B 2211/30525* (2013.01); *F15B 2211/3111* (2013.01); *F15B 2211/3144* (2013.01); *F15B 2211/31523* (2013.01); *F15B 2211/351* (2013.01); *F15B 2211/455* (2013.01); *F15B 2211/613* (2013.01);
(Continued)

(58) Field of Classification Search
CPC ..... E02F 9/2253; E02F 9/2289; E02F 9/2292; E02F 9/2296; E02F 3/34; E02F 9/2217; E02F 9/2228; E02F 9/2242; F15B 11/17
USPC ........................................................ 60/486
See application file for complete search history.

(56) References Cited

U.S. PATENT DOCUMENTS 3,814,265 A * 6/1974 Miller .................... B66C 13/18
                                                      212/230
3,952,511 A * 4/1976 Turner ................ B60K 17/356
                                                      180/242
(Continued)

FOREIGN PATENT DOCUMENTS

GB          1 380 549        6/1973

*Primary Examiner* — Nathaniel Wiehe
*Assistant Examiner* — Richard Drake
(74) *Attorney, Agent, or Firm* — Finnegan, Henderson, Farabow, Garrett & Dunner, LLP; Bookoff McAndrews

(57) ABSTRACT

A hydraulic system is disclosed for use with a machine. The hydraulic system may have a closed-loop, meterless hydraulic circuit with a first pump fluidly connected to a first actuator. The hydraulic system may also have a closed-loop, metered hydraulic circuit with a second pump fluidly connected to a second actuator. The hydraulic system may further have a combiner valve configured to selectively direct fluid from the closed-loop metered hydraulic circuit to the closed-loop meterless hydraulic circuit.

20 Claims, 2 Drawing Sheets

(51) Int. Cl.
*E02F 9/22* (2006.01)
*F15B 1/02* (2006.01)
*F16H 61/4078* (2010.01)

(52) U.S. Cl.
CPC . *F15B 2211/6346* (2013.01); *F15B 2211/665* (2013.01); *F15B 2211/7135* (2013.01); *F15B 2211/851* (2013.01); *F15B 2211/88* (2013.01)

(56) References Cited

U.S. PATENT DOCUMENTS

| | | | | |
|---|---|---|---|---|
| 4,023,364 | A | 5/1977 | Bianchetta | |
| 4,369,625 | A * | 1/1983 | Izumi | E02F 9/2292 414/699 |
| 4,376,371 | A * | 3/1983 | Kojima | B62D 11/18 180/6.48 |
| 4,586,330 | A * | 5/1986 | Watanabe | E02F 9/2221 60/421 |
| 5,946,910 | A * | 9/1999 | Hayashi | E02F 9/2225 60/421 |
| 6,321,535 | B2 * | 11/2001 | Ikari | B62D 5/065 60/421 |
| 6,971,195 | B2 * | 12/2005 | Kondou | E02F 3/325 37/348 |
| 8,387,376 | B2 * | 3/2013 | Son | F15B 11/17 60/394 |
| 8,910,474 | B2 * | 12/2014 | Knussman | E02F 9/2242 60/421 |
| 8,943,819 | B2 * | 2/2015 | Knussman | F15B 7/006 60/421 |
| 8,984,873 | B2 | 3/2015 | Opdenbosch et al. | |
| 9,068,578 | B2 * | 6/2015 | Opdenbosch | E02F 9/2289 |
| 9,394,924 | B2 * | 7/2016 | Berg | E02F 9/2242 |
| 9,506,480 | B2 * | 11/2016 | Hiraku | E02F 9/2235 |
| 9,611,619 | B1 * | 4/2017 | Zimmerman | F15B 1/027 |
| 2001/0008068 | A1 * | 7/2001 | Ikari | B62D 5/065 60/422 |
| 2004/0060747 | A1 * | 4/2004 | Wetzel | E02F 3/325 180/9.44 |
| 2011/0030364 | A1 * | 2/2011 | Persson | E02F 9/2217 60/428 |
| 2013/0098011 | A1 * | 4/2013 | Knussman | F15B 11/17 60/327 |
| 2013/0276441 | A1 * | 10/2013 | Bae | F15B 11/17 60/422 |
| 2014/0020370 | A1 | 1/2014 | Berg | |
| 2014/0119867 | A1 | 5/2014 | Wen et al. | |
| 2014/0165549 | A1 * | 6/2014 | Gabibulayev | F15B 21/001 60/421 |
| 2015/0135700 | A1 * | 5/2015 | Lloyd | F16H 61/4061 60/437 |
| 2017/0016208 | A1 * | 1/2017 | Saitoh | E02F 9/22 |

* cited by examiner

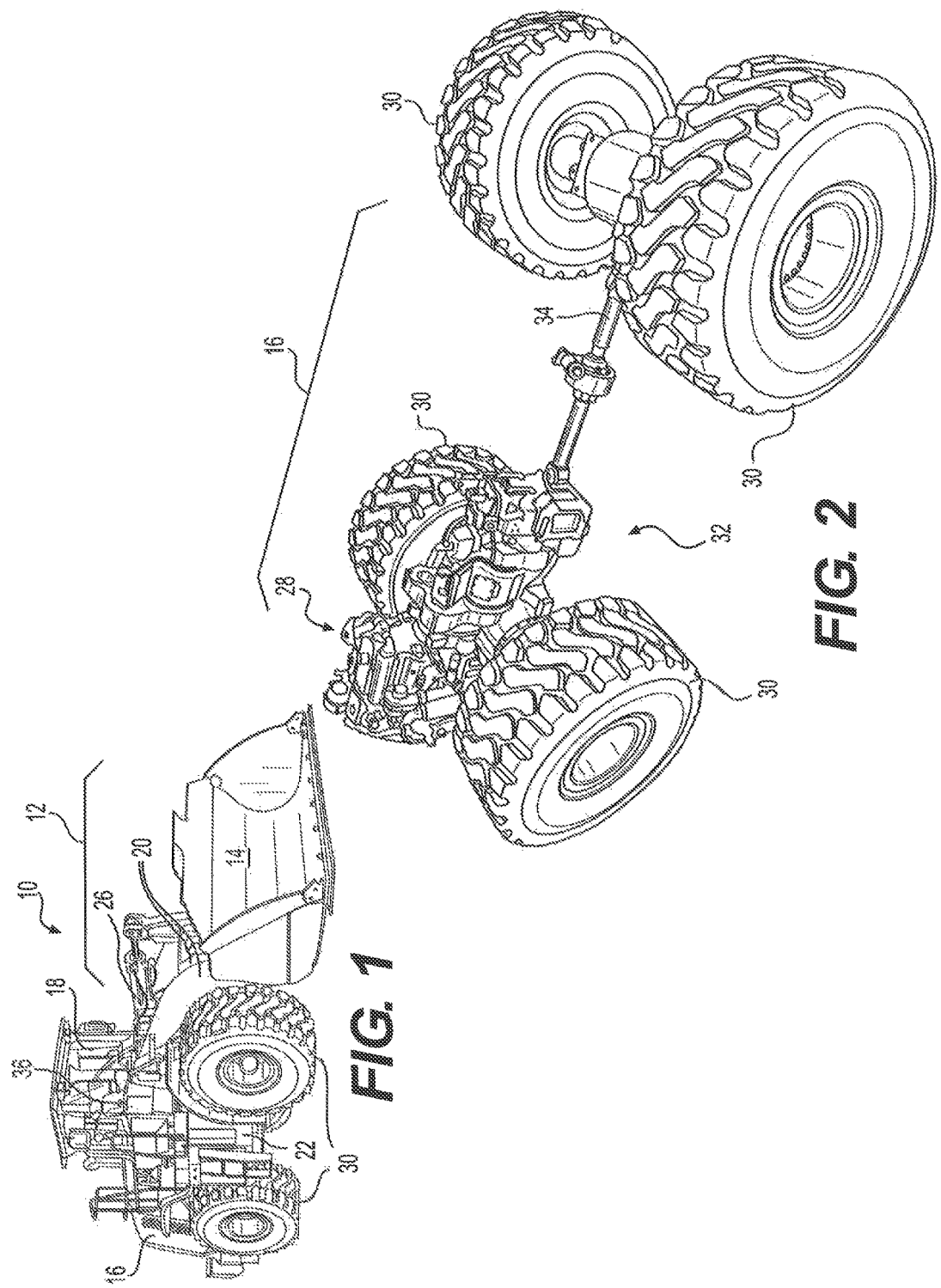

SYSTEM HAVING COMBINABLE TRANSMISSION AND IMPLEMENT CIRCUITS

TECHNICAL FIELD

The present disclosure relates generally to a hydraulic system and, more particularly, to a hydraulic system having combinable transmission and implement circuits.

BACKGROUND

Mobile construction machines, such as excavators, include multiple hydraulic circuits. For example, each machine can have a travel circuit and at least one implement circuit. The travel circuit typically includes an engine-driven pump connected to provide pressurized fluid to a traction motor in a closed configuration. The implement circuit typically includes another engine-driven pump connected to one or more implement actuators (e.g., motors and/or cylinders) in an open configuration. Each of the pumps of the different circuits is generally sized to consume near full engine power, such that the associated actuator(s) can operate at maximum speed and/or with maximum force when commanded to do so by the operator. In most instances, however, the various circuits are not commanded to operate at maximum capacity. En fact, the circuits of a particular machine are most often commanded to operate at only half capacity or less. Accordingly, the conventional circuits may be overdesigned, resulting in a high-cost, bulky, and inefficient system. In addition, care must be taken during combined circuit use, such that the power drawn by the various circuits does not exceed a capacity of the engine to provide power and thereby cause the engine to stall.

One attempt to address the issues discussed above is disclosed in U.S. Patent Publication 2014/0020370 of Berg that published on Jan. 23, 2014 (the '370 publication). In the '370 publication, a hydrostatic drive system is disclosed for use in a vehicle. The system includes an open circuit with a main hydraulic pump that is engine-driven. The main hydraulic pump is configured to drive one or more implement cylinders. The system also includes a closed circuit with an auxiliary hydraulic pump that is also engine-driven. The auxiliary hydraulic pump is configured to drive a travel motor of the vehicle. The system further includes a combiner valve configured to divert fluid from the open circuit to the closed circuit, and a relief valve configured to drain fluid from the dosed circuit that exceeds a maximum capacity of the auxiliary pump. By selectively sharing fluid between the open and closed circuits, the vehicle may be able to travel at higher speeds while using a smaller auxiliary pump. This may result in a smaller system, lower cost, and greater efficiency.

While the system of the '370 publication provides improvement over the prior art, the system may still be less than optimal. In particular, because the system utilizes an open circuit, an overall efficiency of the system may be lower than desired for some applications. In addition, the relief valve used to drain fluid from the closed circuit may be oversized in order to handle the normal flow of the closed circuit and the periodic combined flows from the open and closed circuits. This oversizing of the relief valve may further decrease an efficiency of the system and increase a cost of the system.

The hydraulic system of the present disclosure is directed toward solving one or more of the problems set forth above and/or other problems of the prior art.

SUMMARY

In one aspect, the present disclosure is directed to a hydraulic system. The hydraulic system may include a closed-loop, meterless hydraulic circuit having a first pump fluidly connected to a first actuator. The hydraulic system may also include a closed-loop, metered hydraulic circuit having a second pump fluidly connected to a second actuator. The hydraulic system may further include a combiner valve configured to selectively direct fluid from the closed-loop metered hydraulic circuit to the closed-loop meterless hydraulic circuit.

In another aspect, the present disclosure is directed to a machine. The machine may include a frame, an engine mounted to the frame, a traction device configured to support the frame and propel the machine, and an implement pivotally connected to the frame. The machine may also include a closed-loop, meterless hydraulic circuit having a first pump driven by the engine to pressurize fluid, and a traction motor fluidly connected to the first pump and mechanically connected to the traction device. The machine may further include a closed-loop, metered hydraulic circuit having a second pump driven by the engine to pressurize fluid, an actuator configured to move the implement, and at least one metering valve fluidly disposed between the second pump and the actuator. The machine may additionally include a combiner valve configured to selectively direct fluid from the closed-loop metered hydraulic circuit to the closed-loop meterless hydraulic circuit, and at least one boost pump configured to provide feed to the second pump.

In yet another aspect, the present disclosure is directed to a method of operating a hydraulic system. The method may include circulating fluid from a first pump to a first actuator in a closed loop, meterless manner. The method may also include circulating fluid from a second pump to a second actuator in a dosed loop, metered manner. The method may further include selectively directing fluid from the second pump to the first actuator.

BRIEF DESCRIPTION OF THE DRAWINGS

FIG. 1 is a pictorial illustration of an exemplary disclosed machine;

FIG. 2 is an isometric illustration of an exemplary disclosed drive system that may be used with the machine of FIGS. 1.

DETAILED DESCRIPTION

Figure 3:
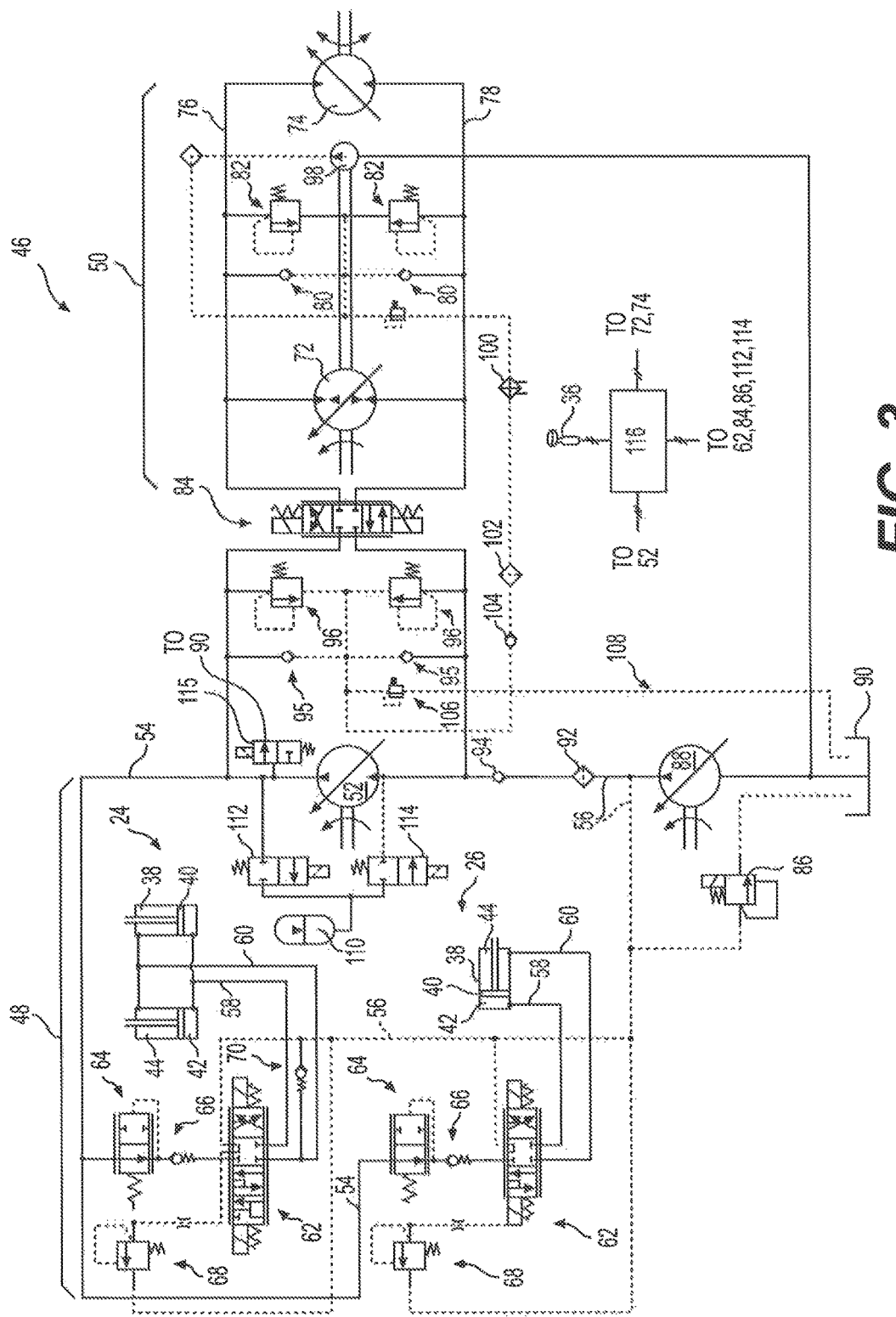
FIG. 3 is a schematic illustration of an exemplary disclosed hydraulic system that may be used in conjunction with the machine of FIG. 1 and the drive system of FIG. 2.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as the wheel loader shown in FIG. 1, an excavator, a dozer, a backhoe, a motor grader, a dump truck, or any other earth moving machine. Machine 10 may include an implement system 12 configured to move a work tool 14, a drive system 16 for propelling machine 10 and providing power to implement system 12, and an operator station 18 situated for manual control of implement system 12 and drive system 16.

Implement system 12 may include fluid actuators that exert forces on structural components of machine 10 to cause lifting and tilting movements of work tool 14. Specifically, implement system 12 may include, among other things, a pair of spaced apart lift arms 20 that are pivotally connected at a proximal end to a frame 22 of machine 10 and at a distal end to work tool 14. One or more lift cylinders 24 (shown only in the schematic of FIG. 3) may be pivotally connected at a first end to frame 22 and at an opposing second end to work tool 14 or to lift arms 20, while a tilt cylinder 26 may be pivotally connected between frame 22 and an upper edge of work tool 14. With this arrangement, extensions and retractions of lift cylinders 24 may function to raise and lower lift arms 20 (and work tool 14), respectively, while extensions and retractions of tilt cylinder 26 may function to rack and dump work tool 14, respectively. It is contemplated that machine 10 could have another linkage arrangement, if desired.

Numerous different work tools 14 may be attachable to a single machine 10 and operator controllable. Work tool 14 may include any device used to perform a particular task such as, for example, a bucket (shown in FIG. 1), a fork arrangement, a blade, a shovel, a ripper, a dump bed, a broom, a snow blower, a propelling device, a cutting device, a grasping device, or any other task-performing device known in the art. Although connected in the embodiment of FIG. 1 to lift and pivot in the vertical direction relative to frame 22 of machine 10, work tool 14 may alternatively or additionally rotate, slide, open and close, or move in any other manner.

As shown in FIG. 2, drive system 16 may be an assembly of components that transfers power from an engine 28 to one or more traction devices 30. In the disclosed embodiment, these components include a transmission 32 that is operatively connected to and driven by engine 28, and one or more axles 34 that connect transmission 32 to traction devices 30. In the disclosed embodiment, transmission 32 is a hydrostatic transmission. As will be described in more detail below, with respect to FIG. 3, a hydrostatic transmission provides an infinitely variable torque-to-speed output ratio within its overall range through the pairing of a variable displacement pump and a fixed-or variable-displacement motor. The pump is mechanically driven by engine 28, while the motor is mechanically connected to drive axles 34. In some embodiments, a gear box and/or a final drive may be disposed between and/or in parallel with transmission 32 and traction devices 30, if desired.

Engine 28 may embody a diesel engine, a gasoline engine, a gaseous-fuel powered engine, or any other type of internal combustion engine known in the art. Engine 28 may be configured to generate a mechanical power output having a speed component and a torque component, and to direct the power output to transmission 32 as an input.

Operator station 18 may include devices that receive input from a machine operator indicative of desired machine maneuvering. Specifically, operator station 18 may include one or more operator interface devices 36, for example a joystick, a steering wheel, and/or a pedal, that are located proximate an operator seat (not shown). Operator interface devices 36 may initiate movement of machine 10, for example travel and/or tool movement, by producing displacement signals that are indicative of desired machine maneuvering. As an operator moves interface device 36, the operator may affect a corresponding machine movement in a desired direction, with a desired speed, and/or with a desired force.

Two exemplary linear actuators (lift and tilt cylinders 24, 26) are shown in the schematic of FIG. 3. It should be noted that, while specific linear actuators are shown, the depicted actuators may represent any type of linear and/or rotary actuators of machine 10.

As shown schematically in FIG. 2, lift and tilt cylinders 24, 26 may each include a tube 38 and a piston assembly 40 arranged within tube 38 to form a first chamber 42 and an opposing second chamber 44. In one example, a rod portion of piston assembly 40 may extend through an end of second chamber 44. As such, second chamber 44 may be considered the rod-end chamber of lift and tilt cylinders 24, 26, while first chamber 42 may be considered the head-end chamber, First and second chambers 42, 44 may each be selectively provided with pressurized fluid and drained of the pressurized fluid to cause piston assembly 40 to move within tube 38, thereby changing an effective length of lift and tilt cylinders 24, 26 and moving work tool 14 (referring to FIG. 1). A flow rate of fluid into and out of first and second chambers 42, 44 may relate to a translational velocity of lift and tilt cylinders 24, 26, while a pressure differential between first and second chambers 42, 44 may relate to a force imparted by lift and tilt cylinders 24, 26 on the associated linkage structure of implement system 12.

As illustrated in FIG. 2, machine 10 may include a hydraulic system 46 having a plurality of fluid components that cooperate to move work tool 14 and machine 10. In particular, hydraulic system 46 may include, among other things, a first hydraulic circuit 48 and a second hydraulic circuit 50. First hydraulic circuit 48 may be an implement circuit associated with lift and tilt cylinders 24, 26 (and/or with any other implements of machine 10), while second hydraulic circuit 50 may be a hydrostatic or travel circuit associated with transmission 32. First and second hydraulic circuits 48, 50 may be selectively fluidly connected with each other to share pressurized fluid, as necessary. It is contemplated that additional and/or different configurations of circuits may be included within hydraulic system 46 such as, for example, an independent circuit associated with each of lift and tilt cylinders 24, 26; an auxiliary circuit; and other circuits, if desired.

First hydraulic circuit 48 may include a plurality of interconnecting and cooperating fluid components that facilitate the simultaneous and independent use and control of the associated actuators. For example, first hydraulic circuit 48 may include an implement pump 52 that is fluidly connected to its associated linear actuators in parallel via a closed-loop formed by supply and return passages 54 and 56. Specifically, fluid pressurized by implement pump 52 may be directed simultaneously to both of lift and tilt cylinders 24, 26 via supply passage 54 and one of a head-end passage 58 or a rod-end passage 60; and fluid discharged by lift and tilt cylinders 24, 26 may flow back to implement pump 52 via the other of the head- or rod-end passages 58, 60 and return passage 56. During an extending operation of a particular one of lift or tilt cylinders 24, 26, the corresponding head-end passage 58 may be filled with fluid pressurized by implement pump 52. While the corresponding rod-end passage 60 may be filled with fluid returning from the linear actuator back to implement pump 52. In contrast, during a retracting operation, rod-end passage 60 may be filled with fluid pressurized by implement pump 52, while head-end passage 58 may be filled with fluid returning from the linear actuator to implement pump 52.

Implement pump 52 may be a variable-displacement, unidirectional type of pump. That is, implement pump 52 may be controlled to draw fluid from lift and tilt cylinders 24, 26, and to discharge the fluid at a specified elevated pressure through a range of flow rates back to lift and tilt cylinders 24, 26 in a single direction. For this purpose, implement pump 52 may include a displacement controller, such as a swashplate and/or other like stroke-adjusting mechanisms. The position of various components of the displacement controller may be electro-hydraulically and/or hydro-mechanically adjusted based on, among other things, a demand, a desired speed, a desired torque, and/or a load of one or more of the actuators to thereby change a displacement (e.g., a discharge rate) of implement pump 52. In exemplary embodiments, the displacement controller may change the displacement of implement pump 52 in response to a combined demand of lift and tilt cylinders 24, 26 and, in some instances, also of transmission 32. The displacement of implement pump 52 may be varied from a zero displacement position at which substantially no fluid is discharged from implement pump 52, to a maximum displacement position at which fluid is discharged from implement pump 52 at a maximum rate into supply passage 54. Implement pump 52 may be drivably connected to engine 28 of machine 10 by, for example, a countershaft, a belt, or in another suitable manner. Alternatively, implement pump 52 may be indirectly connected to engine 28 via a torque converter, a gear box, an electrical circuit, or in any other manner known in the art.

Implement pump 52 may also be selectively operated as a motor. More specifically, when fluid directed through implement pump 52 has a pressure elevated higher than an output pressure of implement pump 52, the elevated pressure may function to drive implement pump 52 to rotate with or without assistance from engine 28. Under some circumstances, implement pump 52 may even be capable of imparting energy to engine 28, thereby improving an efficiency and/or capacity of engine 28. In some instances this functionality may be used to start engine 28.

First hydraulic circuit 48 may be a metered circuit, In particular, independent control over lift and tilt cylinders 24, 26 may be provided by way of a separate metering valve 62 associated with each actuator. Each metering valve 62 may be disposed between passages 54, 56 and passages 58, 60, and movable to selectively interconnect the different passages. In the disclosed embodiment, metering valve 62 is a four-position five-way valve that is solenoid actuated. When metering valve 62 is in a first position (shown in FIG. 3), fluid communication between passages 54-60 may be inhibited. When metering valve 62 is in a second position (e.g., moved to the right from the position shown in FIG. 3), fluid communication may be established between passages 54 and 58 and between passages 56 and 60. When metering valve 62 is in a third position (e.g., moved completely to the left from the position shown in FIG. 3), fluid communication may be established between passages 56, 58, and 60. When metering valve 62 is in a fourth position (e.g., moved to a position between the first and third positions), fluid communication may be established between passages 56 and 58 and between passages 54 and 60. Metering valve 62 may be moved to any position between the first-fourth positions to selectively meter (i.e., restrict) fluid communication and, thereby, control a rate of fluid flow into and/or out of first and second chambers 42, 44. It is contemplated that metering valve 62 may have another form and/or the functionality of metering valve 62 may be divided between multiple valves, if desired.

In some embodiments, a pressure compensator 64, check valve 66, and/or pressure relief valve 68 may be included within first hydraulic circuit 48 and associated with each metering valve 62. In the disclosed example, pressure compensator 64 and check valve 66 are disposed within supply passage 54 at a location upstream of metering valve 62. In this location, pressure compensator 64 may be configured to supply a substantially constant flow rate of fluid to metering valve 62 during fluctuations in supply pressure caused by interaction of first hydraulic circuit 48 with second hydraulic circuit 50. Check. valve 66 may help ensure a unidirectional flow of fluid to metering valve 62. Relief valve 68 may help ensure that the pressures of fluid within first hydraulic circuit remain below a maximum threshold pressure.

An additional check valve 70 may be 48 disposed between metering valve 62, lift cylinders 24, and return passage 56, in some embodiments. Check valve 70 may allow for high-pressure discharge fluid to be selectively returned to lift cylinders 24 and thereby recycled. It is contemplated that a similar check valve could additionally or alternatively be associated with tilt cylinder 26, if desired.

While first hydraulic circuit 48 may be considered a closed-loop circuit, it will be appreciated by those of skill in the art that the respective rates of hydraulic fluid flow into and out of first and second chambers 42, 44 of lift and tilt cylinders 24, 26 during extension and retraction may not be equal. That is, because of the location of the rod portion within second chamber 44, piston assembly 40 may have a reduced pressure area within second chamber 44, as compared with a pressure area within first chamber 42. Accordingly, during retraction of lift and tilt cylinders 24, 26, more hydraulic fluid may be forced out of first chamber 42 than can be consumed by second chamber 44 and, during extension, more hydraulic fluid may be consumed by first chamber 42 than is forced out of second chamber 44. In order to accommodate the excess fluid discharge during retraction and the additional fluid required during extension, first hydraulic circuit 48 may be provided with a relief valve $6 and a connection to a charge pump 88. Relief valve 86 may help ensure that the pressures of fluid within first hydraulic circuit 48 remains below a maximum threshold pressure by selectively releasing fluid from passage 56 to a low-pressure tank 90. Charge pump 88 may be a variable displacement pump configured to draw fluid from tank 90 and push the fluid through a filter 92 and past a check valve 94 into first hydraulic circuit 48. In the disclosed embodiment, charge pump 88 is a dedicated charge pump. It is contemplated, however, that charge pump 88 could additionally be connected to another circuit (e.g., a fan circuit, a brake circuit, etc.), if desired.

Second hydraulic circuit 50 may include a plurality of interconnecting and cooperating fluid components that facilitate the use and control of transmission 32. For example, second hydraulic circuit 50 may include a transmission pump 72 that is fluidly connected to a traction motor 74 via a closed-loop formed by first and second passages 76 and 78. Fluid pressurized by transmission pump 72 may be directed to traction motor 74 via one of passages 76 and 78 and returned back to transmission pump 72 via the other of passages 76 and 78. A rotational direction of traction motor 74 may depend on the particular passage receiving the pressurized fluid and the particular passage returning the fluid. For example, to rotate traction motor 74 in a first direction, transmission pump 72 may pressurize passage 76 and receive fluid back from passage 78. And to rotate traction motor 74 in the opposite direction, transmission pump 72 may pressurize passage 78 and receive fluid back from passage 76, Transmission pump 72 may be a variable displacement, overcenter-type pump. That is, transmission pump 72 may be controlled to draw fluid from traction motor 74 and discharge the fluid at a specified elevated pressure through a range of flow rates back to traction motor 74 in two different directions. For this purpose, transmission pump 72 may include a displacement controller, such as a swashplate and/or other like stroke-adjusting mechanisms. The position of various components of the displacement controller may he electro-hydraulically and/or hydro-mechanically adjusted based on, among other things, a demand, a desired speed, a desired torque, and/or a load of only traction motor 74 to thereby change a displacement (e.g., a discharge rate and/or pressure) of transmission pump 72. The displacement of transmission pump 72 may be varied from a zero displacement position at which substantially no fluid is discharged from transmission pump 72, to a maximum displacement position in a first direction at which fluid is discharged from transmission pump 72 at a maximum rate and/or pressure into passage 76. Likewise, the displacement of transmission pump 72 may be varied from the zero displacement position to a maximum displacement position in a second direction at which fluid is discharged from transmission pump 72 at a maximum rate and/or pressure into passage 78. Transmission pump 72 may be drivably connected to engine 28 of machine 10 by, for example, a countershaft, a belt, or in another suitable manner. Alternatively, transmission pump 72 may be indirectly connected to engine 28 via a torque converter, a gear box, an electrical circuit, or in any other manner known in the art.

Traction motor 74, like lift and tilt cylinders 24, 26, may be driven by a fluid pressure differential. Specifically, traction motor 74 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in the first direction. Conversely, when the first chamber is drained of fluid and the second chamber is filled with pressurized fluid, the pumping mechanism may be urged to move or rotate in the opposite direction. The flow rate of fluid into and out of the first and second chambers may determine an output velocity of traction motor 74 (and also a velocity of connected traction device 30), while a pressure differential across the pumping mechanism may determine an output torque. In the disclosed embodiment, the displacement of traction motor 74 is variable and unidirectional, such that, for a given flow rate and/or pressure of supplied fluid, a speed and/or torque output of traction motor 74 may be adjusted. It is contemplated, however, that traction motor 74 could alternatively have a fixed displacement or be an overcenter type of motor, if desired.

Second hydraulic circuit 50 may be a meterless circuit. In particular, control over the rotation of traction motor 74 may be provided primarily by way of displacement adjustments made to transmission pump 72 and/or traction motor 74. That is, second hydraulic circuit 50 may not include a metering valve that restricts fluid flow between transmission pump 72 and traction motor 74 as a means of adjusting the rotation of traction motor 74. A meterless circuit is generally more efficient than a metered circuit, although control precision and/or response may be somewhat less.

Second hydraulic circuit 50 may be provided with one or more makeup valves 80 and one or more relief valves 82. Makeup valves 80 may each be check valves or another type of valve fluidly coupled between passages 76, 78 and an external supply of makeup fluid. Based on a pressure of the makeup fluid, makeup valves 80 may selectively open to admit fluid that makes up for leakage from second hydraulic circuit 50. Such valves may, however, prohibit fluid from passing in the opposite direction. Relief valves 82 may also each be a type of check valve fluidly coupled between passages 76, 78 and an external drain. Based on a pressure differential across relief valves 82, relief valves 82 may selectively open to release fluid from second hydraulic circuit 50. Relief valves 82, like makeup valves 80, may prohibit fluid from passing in the opposite direction.

As also shown in FIG. 3, first and second hydraulic circuits 48, 50 may be fluidly connected to each other via a combiner valve 84. Combiner valve 84 may comprise one or more flow control components configured to facilitate directing fluid between first and second hydraulic circuits 48, 50 and/or combining fluid from two or more sources. In an exemplary embodiment, combiner valve 84 may comprise a single, three-position, four-way valve that is solenoid actuated. Specifically, combiner valve 84 may be movable from a first position (shown in FIG. 3) up or down to second and third positions, respectively. When combiner valve 84 is in the first position fluid communication between first and second hydraulic circuits 48, 50 may be inhibited. When combiner valve 84 is in the second position (e.g., moved up from the position shown in FIG. 3), fluid communication may be established between passages 56 and 78 and between passages 76 and 54. When combiner valve 84 is in a third position (e.g., moved down from the position shown in FIG. 3), fluid communication may be established between passages 56 and 76 and between passages 78 and 54. Combiner valve 84 may be moved to any position between the first-third positions to selectively meter (i.e., restrict) fluid communication and, thereby, control a rate of fluid flow between first and second hydraulic circuits 48, 50.

It may be desirable, in some operations, to supplement a flow of fluid provided to a particular circuit with a flow of fluid from the other circuit. For example, when only operation of traction motor 74 is active (i.e., when lift and tilt cylinder movement is not being requested by the operator of machine 10), it may be desirable for traction motor 74 to receive a maximum flow rate of pressurized fluid possible, such that machine 10 may travel at a maximum speed. For this purpose, combiner valve 84 may be used to direct fluid from implement pump 52 into second hydraulic circuit 50 to combine with the fluid from transmission pump 72 being directed to traction motor 74. Combiner valve 84 may be opened to one of the second and third positions (depending on a rotational direction of traction motor 74) at this time to facilitate the supplemental flow. In the disclosed embodiment, during simultaneous use of one or both of lift and tilt cylinders 24, 26 and traction motor 74 and during active operation of only first hydraulic circuit 48 (i.e., when machine 10 is stationary), combiner valve 84 may be moved to its first position to inhibit flow sharing between the first and second hydraulic circuits 48, 50.

Additionally makeup valves 95 and relief valves 96 may be disposed between first and second hydraulic circuits 48, 50 (e.g., in association with combiner valve 84), and function in a manner similar to makeup and relief valves 80, 82, respectively. Specifically, makeup and relief valves 95, 96 may each be check valves or another type of valve moveable to admit fluid into or release fluid from first and second hydraulic circuits 48, 50. These valves may prohibit fluid from passing in the opposite directions.

In some embodiments, an additional charge pump 98 may be associated with one or both of first and second hydraulic circuits 48, 50 to provide makeup fluid in addition to that already being provided by charge pump 88. In these embodiments, charge pump 98 is an auxiliary pump associated with another circuit (e.g., the fan and/or brake circuits). The fluid from charge pump 88 may be configured to direct pressurized fluid into second hydraulic circuit 50 via makeup valves 82 and/or into first hydraulic circuit 48 via a heat exchanger 100, a filter 102, and a check valve 104. A relief valve 106 may be associated with charge pump 88, and be configured to selectively direct excess fluid to tank 90 via a drain passage 108.

As described above, implement pump 52 may be used to start engine 28 in some embodiments. For this purpose an accumulator 110 may be fluidly connected to implement pump 52 by way of an inlet valve 112 and an outlet valve 114. Accumulator 110 may embody, for example, compressed gas, membrane/spring, or bladder type of accumulator configured to accumulate excess fluid pressurized by implement pump 52 during machine operation, and to discharge accumulated fluid back to the inlet of pump 52 during machine startup (and/or during times of insufficient fluid). Excess hydraulic fluid, either from implement pump 52 or from lift and/or tilt cylinders 24, 26 (e.g., during an overrunning operation) may be directed into accumulator 110 via inlet valve 112, while the accumulated fluid may be discharged from accumulator 110 via outlet valve 114. Inlet and outlet valves 112, 114 may both be dual-position, solenoid operated valves that are spring-biased to closed positions, as is shown in FIG. 3.

In one embodiment, an additional valve (e.g. a bypass valve) 115 may be located on a discharge of pump 52 to inhibit pressure oscillations when switching between combined flow (i.e., flow combined from accumulator 110 and from pump 52) and flow from only pump 52. Valve 115 may transition from closed to fully open to during switching, and then valve 115 may transition back to closed, With sufficient flow area through valve 115, the displacement of pump 52 may be able to transition directly to a demanded displacement in the new mode of operation without having to de-stroke to a zero displacement.

During operation of machine 10, the operator of machine 10 may utilize interface device 36 to provide signals that identify desired movements of the various linear and/or rotary actuators to a controller 116. Based upon one or more signals, including the signal from interface device 36 and, for example, signals from various pressure and/or position sensors (not shown) located throughout hydraulic, system 46, controller 116 may command movement of the different valves and/or displacement changes of the different pumps and motors to advance a particular one or more of the linear and/or rotary actuators to a desired position in a desired manner (i.e., at a desired speed and/or with a desired force).

Controller 116 may embody a single microprocessor or multiple microprocessors that include components for controlling operations of hydraulic system 46 based on input from the operator of machine 10 and based on sensed or other known operational parameters. Numerous commercially available microprocessors can be configured to perform the functions of controller 116. It should be appreciated that controller 116 could readily be embodied in a general machine microprocessor capable of controlling numerous machine functions. Controller 116 may include a memory, a secondary storage device, a processor, and any other components for running an application. Various other circuits may be associated with controller 116 such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency is desired. The disclosed hydraulic system may provide for improved. efficiency through the use of closed-loop operation, meterless technology, flow-sharing, and flow-combining. Operation of hydraulic system 46 will now be described.

During operation of machine 10, an operator located within station 18 may tilt and/or rotate interface device 36 in a particular direction by a particular amount and/or with a particular speed to command motion of work tool 14 and/or travel of machine 10 in a desired direction, at a desired velocity, and/or with a desired force. One or more corresponding signals generated by interface device 36 may be provided to controller 116 indicative of the desired motion. In some embodiments, additional information, for example machine performance information such as sensor data (e.g., pressure data, position data, speed data, pump or motor displacement data, and other data known in the art) may also be provided to controller 116.

For example, in response to the signals from interface device 36 indicative of a desire to lift work tool 14 with an increasing velocity, and based on the machine performance information, controller 116 may generate control signals directed to the stroke-adjusting mechanism of implement pump 52 within first hydraulic circuit 48 and/or to metering valve 62 associated with lift cylinders 24. These control signals may include a first control signal that causes implement pump 52 to increase its displacement and discharge pressurized fluid into supply passage 54 at a greater rate, and a simultaneous second control signal that causes metering valve 62 to move more toward its second position. As described above, when metering valve 62 is in its first position (or in a position between its first and second position), supply passage 54 may be fluidly communicated with head-end passage 58, and rod-end passage 60 may be fluidly communicated with return passage 56. When fluid from implement pump 52 is directed into first chamber 42 via supply and head-end passages 54, 58, return fluid from second chamber 44 of lift cylinders 24 may flow back to implement pump 52 via rod-end and return passages 60, 56 in closed-loop manner. These fluid flows may result in extension of lift cylinders 24 and lifting of work tool 14. Movement of metering valve 62 in the opposite direction may similarly result in retraction of lift cylinders 24 and lowering of work tool 14. The racking and dumping of tilt cylinders 26 may be implemented in the same manner.

As described above, the rates of fluid flow into and out of lift cylinders 24 (and also of tilt cylinder 26) may not be equal during normal extension and retraction operations. In order to accommodate the additional fluid required during extension, fluid pressurized by charge pump 88 and/or charge pump 98 may be selectively directed into first hydraulic circuit 48. In contrast, during retraction of lift cylinders 24 (and tilt cylinder 26), excess flow from first hydraulic circuit 48 (i.e., some of the fluid exiting first chamber 42) may be directed through relief valves 68 and/or 86 into tank 90. Alternatively, the excess fluid from first chamber 42 may be directed into accumulator 110 via inlet valve 112.

In another example, in response to the signals from interface device 36 indicative of a desire to propel machine 10 with an increasing velocity, and based on the machine performance information, controller 116 may generate control signals directed to the stroke-adjusting mechanism of transmission pump 72 and/or traction motor 74 within second hydraulic circuit 50. These control signals may include a first control signal that causes implement pump 52 to increase its displacement and discharge pressurized fluid into one of passages 76, 78 (depending on the rotational direction of traction devices 30) at a greater rate and, in some instances, a simultaneous second control signal that causes traction motor 74 to decrease its displacement. It is contemplated that the first and second signals may be generated independently and/or at different times, if desired. As described above, second hydraulic circuit 50 may be a meterless circuit. As such, the speed and force exerted on traction devices 30 may be primarily dependent on the rotational speed and displacement of transmission pump 72 and the displacement of traction motor 74, without any restriction being provided by an associated metering valve. When passage 76 receives pressurized fluid from transmission pump 72 and traction motor 74 discharges fluid to passage 78, traction motor 74 may be caused to rotate in a first direction. In contrast, when passage 76 receives pressurized fluid from traction motor 74 and transmission pump 72 discharges fluid to passage 78, traction motor 74 may be caused to rotate in a second and opposite direction.

When second hydraulic circuit 50 is receiving fluid pressurized by only transmission pump 72, traction device 30 may have a high-speed capacity that is lower than a maximum travel speed. The high-speed capacity may be suitable for travel at a time when work tool 14 is being simultaneously used (e.g., lifted, lowered, racked, dumped). For example, the high-seed capacity may be appropriate for the starting and ending portions of a typical truck loading cycle When machine 10 is pulling away from the truck at the same time as lowering an empty bucket, or when machine 10 is approaching the truck at the same time as raising a full bucket, In either of these situations, the total power produced by engine 28 must be split between first and second hydraulic circuits 58, 60.

However, during operation of machine 10 within a middle segment of the truck loading cycle (e.g., during travel between dig and dump locations), the operator of machine 10 may desire the ability to operate at the maximum travel speed so as to reduce a time of the cycle. In order to facilitate the maximum travel speed, fluid pressurized by implement pump 52 may be selectively directed from first hydraulic circuit 48 to second hydraulic circuit 50 (e.g., via combiner valve 84) to join the fluid from transmission pump 72 entering traction motor 74. This combined flow of fluids may function to increase the speed of traction motor 74.

Accordingly, during stationary machine operations that involve only movement of work tool 14, first hydraulic circuit 48 may be substantially isolated from second hydraulic circuit 50. The same may also be true during machine operations that involve both travel and work tool use. However, during machine operations that involve only travel of machine 10 (i.e., with no movement of work tool 14), first and second hydraulic circuits 58, 60 may implement flow sharing.

It should be noted that, even when flow from both circuits is shared, the newly formed circuit may still be closed-loop and also meterless, in particular, implement pump 52 may discharge about (i.e., neglecting loss due to leakage and the corresponding makeup) the same flow rate of fluid to second hydraulic circuit 50 as it receives back from second hydraulic circuit 50. And at this same time, transmission pump 72 may discharge about the same flow rate of fluid to traction motor 74 as it receives back from traction motor 74.

When switching between isolated-circuit operation and flow-sharing operation, care should be taken to ensure a gentle transition that does not cause machine instabilities or discomfort to the operator. Controller 116 may implement this transition by coordinating the operations of implement and transmission pumps 52, 72; metering valves 62; and combiner valve 84. For example, during machine travel at the maximum speed (i.e., when both implement and transmission pumps 52, 72 are contributing fluid to second hydraulic circuit 50) when interface device 36 is moved by the operator to indicate a desire to lift, lower, rack, or dump work tool 14, controller 116 may destroke (i.e., reduce a displacement of) implement pump 52, close combiner valve 84 (i.e., move combiner valve 84 to its first position), and decrease the displacement of traction motor 74. As described above, closing combiner valve 84 may substantially isolate first hydraulic circuit 48 from second hydraulic circuit 50. Destroking implement pump 52 will help ensure that shock loading of first hydraulic circuit 48 does not occur upon isolation upon instantly directing all fluid discharged by implement pump 52 into only first hydraulic circuit 48). Decreasing the displacement of traction motor 74 may help to maintain as high a speed as possible at traction device 30, even though the flow rate of fluid through traction motor 74 will drop because of the sudden circuit isolation.

In another example, during stationary use of work tool 14 or during combined work tool use and travel (i.e., when flow-sharing is not occurring), the operator may stop using work tool 14 and request an increase in travel speed that requires flow-sharing. When this occurs, controller 116 may simultaneously increase the displacement of motor 74, open combiner valve 84 (i.e., move combiner valve 84 to its second or third positions, depending on the rotational direction of traction motor 74), and increase the displacement of implement pump 52. As described above, increasing the displacement of traction motor 74 may help to maintain about the same speed with the combined flow that was present before the flows of fluid combined. Opening combiner valve 84 may allow for fluid being pressurized by implement pump 52 to flow into second hydraulic circuit 50 and combine with the flow from transmission pump 72. Increasing the displacement of implement pump 52 will help ensure that shock loading of second hydraulic circuit 50 does not occur upon sudden flow-sharing.

First hydraulic circuit 48 may also be used to start or assist starting of engine 28. In particular, high-pressure fluid stored within accumulator 110 may be selectively directed through implement pump 52 at startup of engine 28 to cause implement pump 52 to function as a motor and generate torque used to turn engine 28 over. In some embodiments, this torque generated by implement pump 52 alone may be sufficient to start engine 28 without any other assistance. In other embodiments, the torque generated by implement pump 52 may simply reduce an amount of torque required from a conventional starter. In yet other embodiments, the high-pressure fluid may be passed through implement pump 52 during active operation of engine 28 when pressurized fluid is unneeded by either of first and second hydraulic circuits, thereby increasing a capacity of engine 28 to provide for other machine loads.

In the disclosed hydraulic system, flows provided by the different pumps may be recirculated back through the same pumps. In addition, some of the flows may be substantially unrestricted during modulation of the associated actuator. The recirculation of high-pressure fluid and the limited use of flow-restriction may help to conserve energy otherwise wasted in the actuation process. Thus, embodiments of the disclosure may provide improved energy usage and conservation. Further, because the connection of first and second hydraulic circuits 48, 50 may still retain the closed-loop configuration, energy may be conserved in all modes of operation. In. addition, the meterless operation of second hydraulic circuit 50 may, in some applications, allow for a reduction or even complete elimination of metering valves for controlling fluid flow. This reduction may result in a less complicated and/or less expensive system.

The disclosed hydraulic system may also provide for the use of smaller pumps. In particular, because flow-sharing may be implemented to obtain the maximum travel speed of machine 10, transmission pump 72 may be smaller than conventional transmission pumps used in similar applications. The smaller pump may have a lower cost, a higher efficiency, and a smaller footprint.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:
    a closed-loop, meterless hydraulic circuit having a first pump fluidly connected to a first actuator;
    a closed-loop, metered hydraulic circuit having a second pump fluidly connected to a second actuator;
    a combiner valve configured to selectively direct fluid from the closed-loop metered hydraulic circuit to the closed-loop meterless hydraulic circuit;
    at least one input device configured to receive input indicative of a desire to actively operate the closed-loop, meterless hydraulic circuit and the closed-loop, metered hydraulic circuit; and
    a controller in communication with the at least one input device and the combiner valve, wherein, when input is received indicative of a desire to transition between active operation of only the first actuator to simultaneous operation of both the first and second actuators, the controller is configured to simultaneously destroke the second pump, close the combiner valve, and decrease a displacement of the first actuator.

2. The hydraulic system of claim 1, wherein the closed-loop, meterless hydraulic circuit is a hydrostatic transmission circuit.

3. The hydraulic system of claim 2, wherein the closed-loop, metered hydraulic circuit is an implement circuit.

4. The hydraulic system of claim 1, wherein, during active operation of only the second actuator, the controller is configured to close the combiner valve and destroke the first pump.

5. The hydraulic system of claim 1, wherein, during active operation of only the first actuator, the controller is configured to open the combiner valve and cause both the first and second pumps to provide pressurized flow to the closed-loop, meterless hydraulic circuit.

6. The hydraulic system of claim 1, wherein:
    the closed-loop, metered hydraulic circuit includes at least one metering valve configured to meter fluid from the second pump to the second actuator; and
    once the combiner valve is closed and the second pump is at zero displacement during the transition from operation of only the first actuator to operation of both the first and second actuators, the controller is further configured to cause the at least one metering valve to meter fluid and to increase displacement of the second pump.

7. The hydraulic system of claim 1, wherein:
    the closed-loop, metered hydraulic circuit includes at least one metering valve configured to meter fluid from the second pump to the second actuator;
    wherein the at least one input device is further configured to receive input indicative of a desire to actively operate the first and second actuators; and
    wherein, during transition from active operation of both the first and second actuators to active operation of only the first actuator, the controller is configured to destroke the second pump and to close the at least one metering valve.

8. The hydraulic system of claim 7, wherein, once the combiner valve is closed and the second pump is at zero displacement during transition from operation of both the first and second actuators to operation of only the first actuator, the controller is further configured to increase the displacement of the second pump, to cause the at least one metering valve to meter fluid, and to increase the displacement of the first actuator.

9. The hydraulic system of claim 1, further including a boost pump configured to provide feed to the second pump.

10. The hydraulic system of claim 9, wherein the boost pump is an auxiliary pump configured to also provide pressurized fluid to an auxiliary circuit.

11. The hydraulic system of claim 10, wherein:
    the boost pump is a first boost pump; and
    the hydraulic system further includes a second dedicated boost pump configured to provide feed to the second pump.

12. The hydraulic system of claim 1, further including an accumulator configured to selectively receive pressurized fluid from and discharge accumulated fluid to the second pump.

13. A machine, comprising:
    a frame;
    an engine mounted to the frame;
    a traction device configured to support the frame and propel the machine;
    an implement pivotally connected to the frame;
    a closed-loop, meterless hydraulic circuit having a first pump driven by the engine to pressurize fluid, and a first actuator fluidly connected to the first pump;
    a closed-loop, metered hydraulic circuit having a second pump driven by the engine to pressurize fluid, a second actuator configured to move the implement, and at least one metering valve fluidly disposed between the second pump and the second actuator;
    a combiner valve configured to selectively direct fluid from the closed-loop, metered hydraulic circuit to the closed-loop, meterless hydraulic circuit;
    at least one boost pump configured to provide feed to the second pump;
    at least one input device configured to receive input indicative of a desire to actively operate the closed-loop, meterless hydraulic circuit and the closed-loop, metered hydraulic circuit; and
    a controller in communication with the at least one input device and the combiner valve, wherein, when input is received indicative of a desire to transition between active operation of only the first actuator to simultaneous operation of both the first and second actuators, the controller is configured to simultaneously destroke the second pump, close the combiner valve, and decrease a displacement of the first actuator.

14. The machine of claim 13, further including an accumulator configured to selectively receive pressurized fluid from and discharge accumulated fluid to the second pump during startup of the engine.

15. A method of operating a hydraulic system, comprising:
circulating fluid from a first pump to a first actuator in a closed-loop, meterless manner;
circulating fluid from a second pump to a second actuator in a closed loop, metered manner;
selectively directing fluid from the second pump to the first actuator;
wherein, during active operation of only the second actuator, the method further includes:
inhibiting fluid from the second pump from flowing to the first actuator; and
destroking the first pump;
wherein, upon receiving input indicative of a desire to transition from active operation of only the first actuator to active operation of both the first and second actuators, the method further includes:
responsively and simultaneously destroking the second pump, inhibiting fluid from the second pump from flowing to the first actuator, and decreasing a displacement of the first actuator; and
once the second pump is at zero displacement during transition from operation of only the first actuator to operation of both the first and second actuators, the method further includes:
metering fluid to the second actuator; and
increasing a displacement of the second pump.

16. The method of claim 15, wherein:
during active operation of only the first actuator, the method further includes simultaneously directing fluid from both the first and second pumps to the first actuator; and
during simultaneous operation of both the first and second actuators, the method further includes inhibiting fluid from the second pump from flowing to the first actuator.

17. The machine of claim 13, wherein the closed-loop, meterless hydraulic circuit is a hydrostatic transmission circuit.

18. The machine claim 17, wherein the closed-loop, metered hydraulic circuit is an implement circuit.

19. The machine of claim 13, wherein the at least one boost pump includes a first boost pump and second boost pump configured to provide feed to the second pump.

20. The method of claim 15, further including operating a boost pump to provide fluid to the second pump.

* * * * *